May 2, 1961  H. M. GABLES  2,982,891
ALTERNATING CURRENT ELECTROLYTIC CAPACITOR
Filed May 2, 1958
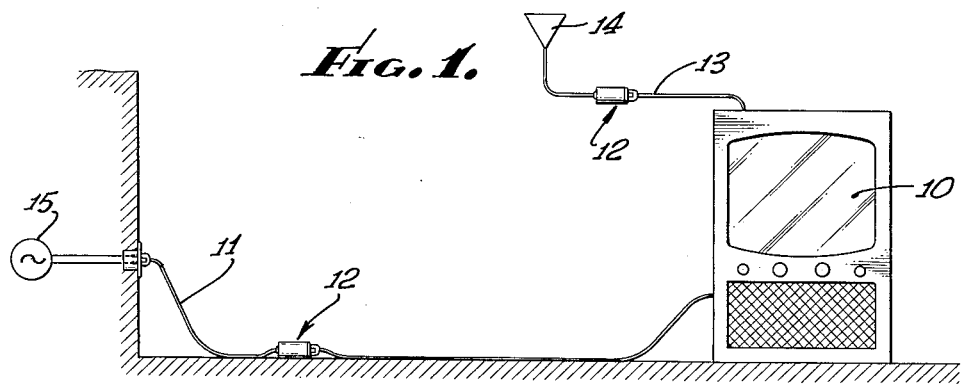
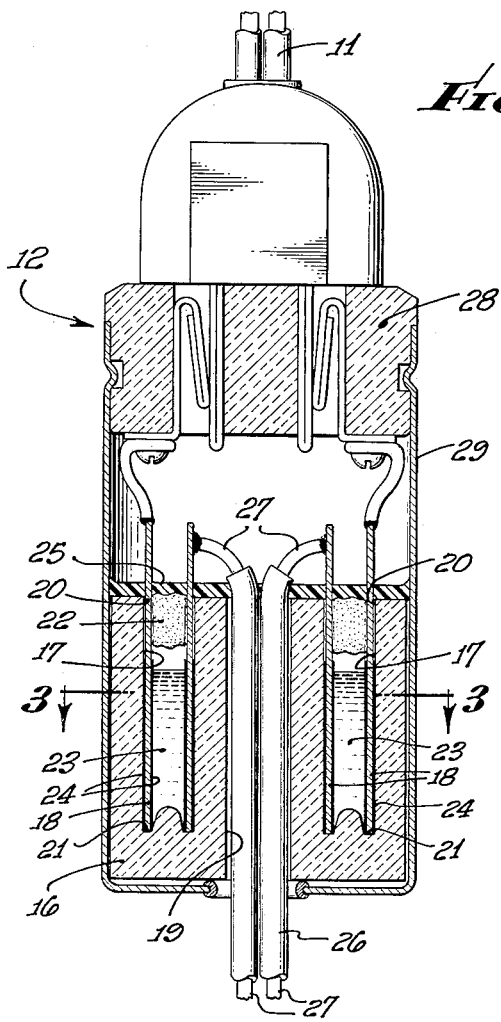
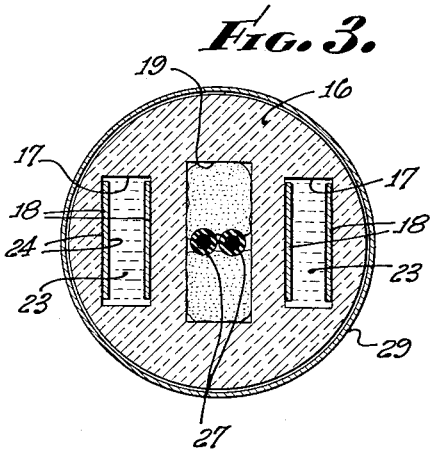
HALL M. GABLES
INVENTOR.
BY John Joseph Hall
ATTORNEY.

United States Patent Office 2,982,891
Patented May 2, 1961

2,982,891
ALTERNATING CURRENT ELECTROLYTIC CAPACITOR

Hall M. Gables, 1134 7th St., Santa Monica, Calif.

Filed May 2, 1958, Ser. No. 732,648

15 Claims. (Cl. 317—230)

This invention relates to improvements in electrolytic capacitors, particularly with reference to United States Patent No. 2,736,846, previously obtained by me.

I have found that an electrolytic capacitor may be made up of an acid solution alone as the electrolyte in combination with silver electrodes or with copper electrodes, thus dispensing with the use of metallic salts such as silver nitrate or copper nitrate in the electrolyte. Such a combination is especially suited for use in low voltage circuits, such as a TV antenna circuit. Acids such as hydrochloric, sulfuric, or nitric may be used in dilute solutions. The concentration of acid is not critical, but I have found that 1 normal solutions produce the best results.

I have also found that the use of distilled water for the electrolytic solution improves the general functioning of my device. However, I have used ordinary tap water for the electrolytic solution, but the impurities in tap water such as ions of calcium and magnesium salts cause the formation of films on the electrode after the device has been operating for some time, thereby resulting in lower capacitance, and an excessive voltage drop particularly in power circuits.

Another improvement which I have discovered is the application of a thin coating of grease or wax on the surface of the electrodes to form a protective coating thereon, thereby greatly decreasing the tendency of the electrodes to form films such as oxides or sulfides of the metal used as the electrode. The formation of films on the surface of the electrodes is highly undesirable since such films increase the resistance of the electrodes thereby reducing the capacitance of the device and eventually blocking current flow in power circuits and detuning antenna circuits.

Any type of grease or wax may be used which is water repellent, acid resistant, and capable of withstanding temperatures up to 212 degrees Fahrenheit or more. I have found that greases containing chemicals such as aluminum oleate or aluminum stearate are satisfactory, as well as waxes such as Simoniz, the well-known automobile polish. Regular automobile lubricating oil is also suitable for this purpose, as well as petroleum jelly.

I have further found that the metal for the electrodes may be any metal below hydrogen in the electromotive (E.M.F.) series in combination with any salt of that metal or of any other metal below hydrogen in the E.M.F. series which dissociates in an ionizing medium such as water or other ionizing liquids. For example, silver electrodes may be used in combination with an aqueous solution of copper sulfate as the electrolyte, and conversely, copper electrodes may be used in combination with an aqueous solution of silver nitrate.

Salts of metals above hydrogen in the E.M.F. series may be used in combination with electrodes composed of metals below hydrogen in the E.M.F. series, particularly in low voltage circuits such as an antenna circuit. For example, a dilute solution of sodium chloride in water will produce the desired results with silver or copper electrodes. Such metallic salts must be capable of ionization when added to an ionizing medium such as water.

Coatings of the proper metals may be used as electrodes as well, either over another metal or over an inert material such as glass. For example, I have made up electrodes consisting of a silver coating over glass and a silver coating over copper. The thickness of the silver coating may vary from 0.0001 to 0.0005 inch with satisfactory results. I have found that where the silver coating is over copper, after a period of operation of the device, the copper will come through the silver. This can be prevented by applying a thin coating of grease or wax over the silver coating, as mentioned above.

It is, therefore, an object of my invention to improve the functioning of my electrolytic capacitor by substituting distilled water for tap water in making up the electrolytic solution.

It is a further object of my invention to provide the use of an acid solution as the electrolyte in my capacitor, thereby dispensing with the use of metallic salts in the electrolyte.

Another object of my invention is the application of a thin coating of grease or wax, automobile lubricating oil or petroleum jelly, on the electrode surfaces to decrease any formation of film such as oxides or sulfides of the metal of the electrodes.

A still further object of my invention is to provide the use of any metal below hydrogen in the E.M.F. series in combination with any salt of such metal or any other metal below hydrogen in the E.M.F. series in an ionizing medium.

These and other objects will be more readily understood by reference to the following description and claims, taken in conjunction with the accompanying drawing forming a part hereof, in which Figure 1 is a diagrammatic view illustrating how my electrolytic capacitor may be connected in the power circuit and antenna circuit of a typical communications receiver.

Figure 2 is a longitudinal sectional view of the device.

Figure 3 is a cross section along line 3—3 of Figure 2.

A typical unit of the device may be made up as follows:

The electrolyte solution is prepared by mixing 18 grams of silver nitrate with 12 grams of distilled water to form a saturated solution of silver nitrate. A saturated solution will produce the greatest conductivity, but my device will operate when only 5 to 10 percent solutions of silver nitrate or other proper electrolyte are used.

To this solution is added 3 milligrams of pure gelatin to buffer and stabilize the mixture. Greater amounts of gelatin may be used if desired. The plastic case 16 is cast or molded of plastic material with cavities 17 for the electrodes 18 and a central bore 19. I have found epoxy resins to be suitable as the plastic material for the case. The electrodes are first covered with a thin coating, about 1/32 of an inch thick, of Simoniz wax; Figures 2 and 3 show the coating, 24.

The electrodes 18, are then inserted, two to each cavity 17, in the case 16. The ends of the electrodes are fitted into the notches 21, at the bottom of the cavities 17. The cavity openings 20, are then closed with cotton fillers 22 after the electrolyte 23 has been added. The electrolytic solution must not touch the cotton fillers, else it would be absorbed thereon.

Then, the cavity openings 20 are sealed hermetically with liquid epoxy resin poured over the cotton fillers 22 as a sealant 25, leaving the tops of the electrodes 18 free to be connected to the conductors 27 as shown in Figure 2. The insulation 26 prevents any possible shorting of the current. A female plug 28 is then fitted over the top of the case 16, and a shield 29 is slipped over the case 16 for electrical safety. The device is now ready for use.

As shown in Figure 1, the device may be used in both the power leads 11 and antenna leads 13 of the communications receiver 10. I have found that best results are obtained when the device 12 is used in series of two units between the power source 15 and the communications receiver 10 power input, and in series of two units between the antenna 14 and the antenna lead input of the receiver 10.

When placed in operation, the capacitors produced a TV picture of greatly improved definition due to better voltage regulation and reduction of interference hash. Improved results have been obtained by the use of these capacitors in both color and black and white TV sets. Further, audio interference is attenuated.

While I have described my invention in detail with reference to the accompanying drawing illustrating the preferred form of my invention, it is understood that numerous changes in the details and construction and arrangement of parts may be made without departing from the spirit and scope of the invention as hereinafter claimed.

I claim:

1. An alternating current electrolytic capacitor comprising a pair of spaced nonpolarized electrodes each electrode in turn acting as a cathode and then as an anode while the other is an anode and then a cathode coated with silver, a coating of grease over the silver coating, a solution of copper sulfate in distilled water which is in contact with said coating, and means for conducting alternating electric current to and from said electrodes.

2. An alternating current electrolytic capacitor comprising a pair of spaced nonpolarized electrodes each electrode in turn acting as a cathode and then as an anode while the other is an anode and then a cathode coated with copper, a coating of grease over the copper coating, a solution of silver nitrate in distilled water which is in contact with said coating, and means for conducting alternating electric current to and from said electrodes.

3. An alternating current electrolytic capacitor comprising a pair of spaced nonpolarized electrodes each electrode in turn acting as a cathode and then as an anode while the other is an anode and then a cathode of a metal below hydrogen in the electromotive series, an electrolyte containing said electrodes and composed of a metallic salt of a metal above hydrogen in the electromotive series dissolved in an ionizing medium, a coating of semi-solid mixture of paraffin hydrocarbons resistant to water, acid, and heat over said electrodes and in contact with said electrolyte, and means for conducting alternating electric current to and from said electrodes.

4. An alternating current electrolyte capacitor comprising a pair of spaced nonpolarized electrodes each electrode in turn acting as a cathode and then as an anode while the other is an anode and then a cathode of a metal below hydrogen in the electromotive series, an electrolyte comprising a metallic salt of a metal above hydrogen in the electromotive series dissolved in an ionizing medium, a coating of grease over said electrodes and in contact with said electrolyte, and means for conducting alternating electric current to and from said electrodes.

5. An alternating current electrolytic capacitor comprising a pair of spaced nonpolarized electrodes each electrode in turn acting as a cathode and then as an anode while the other is an anode and then a cathode of a metal below hydrogen in the electromotive series, a proton yielding electrolyte, a coating of a semi-solid mixture of paraffin hydrocarbons resistant to water, heat, and acid over said electrodes and in contact with said electrolyte, and means for conducting alternating electric current to and from said electrodes.

6. An alternating current electrolytic capacitor comprising a pair of spaced nonpolarized electrodes each electrode in turn acting as a cathode and then as an anode while the other is an anode and then a cathode of a metal below hydrogen in the electromotive series, an electrolyte containing aqueous hydrochloric acid, a coating of a semi-solid mixture of paraffin hydrocarbons resistant to water, heat, and acid over said electrodes and in contact with said electrolyte, and means for conducting alternating electric current to and from said electrodes.

7. An alternating current electrolytic capacitor comprising a pair of spaced nonpolarized electrodes each electrode in turn acting as a cathode and then as an anode while the other is an anode and then a cathode of a metal below hydrogen in the electromotive series, an electrolyte containing aqueous sulfuric acid, a coating of a semi-solid mixture of paraffin hydrocarbons resistant to water, heat, and acid, over said electrodes and in contact with said electrolyte, and means for conducting alternating electric current to and from said electrodes.

8. An alternating current electrolytic capacitor comprising a pair of spaced nonpolarized electrodes each electrode in turn acting as a cathode and then as an anode while the other is an anode and then a cathode of a metal below hydrogen in the electromotive series, an electrolyte containing aqueous nitric acid, a coating of a semi-solid mixture of paraffin hydrocarbons resistant to water, heat, and acid, over said electrodes and in contact with said electrolyte, and means for conducting alternating electric current to and from said electrodes.

9. An alternating current electrolytic capacitor comprising a pair of spaced nonpolarized electrodes each electrode in turn acting as a cathode and then as an anode while the other is an anode and then a cathode of a metal below hydrogen in the electromotive series, a proton yielding electrolyte, a coating of grease over said electrodes and in contact with said electrolyte, and means for conducting alternating electric current to and from said electrodes.

10. An alternating current electrolytic capacitor comprising a pair of spaced nonpolarized electrodes each electrode in turn acting as a cathode and then as an anode while the other is an anode and then a cathode of a metal below hydrogen in the electromotive series, a proton yielding electrolyte, a coating of wax over said electrodes and in contact with said electrolyte, and means for conducting alternating electric current to and from said electrodes.

11. In a nonpolarized alternating current electrolytic capacitor of the type having two electrodes alternating in polarity with each other and composed of the same metal, said metal being below hydrogen in the electromotive series, and having an electrolyte of a metal below hydrogen in the electromotive series, the improvement comprising a coating of grease over said electrodes which coating is in contact with said electrolyte.

12. A capacitor according to claim 11 wherein the coating is of a semi-solid mixture of paraffin hydrocarbons resistant to water, heat, and acid.

13. A capacitor according to claim 11 wherein the coating is of wax.

14. A nonpolarized alternating current electrolytic capacitor comprising a pair of spaced electrodes of a metal below hydrogen in the electromotive series, an electrolyte of a metal below hydrogen in the electromotive series which metal is different from the metal of the electrodes, a coating of a semi-solid mixture of paraffin hydrocarbons resistant to water, heat, and acid over said electrodes and in contact with said electrolyte, and means for conducting alternating electric current to and from said electrodes.

15. A capacitor according to claim 14 where the coating is of grease.

References Cited in the file of this patent

UNITED STATES PATENTS

| | | | |
|---|---|---|---|
| 1,555,803 | Huber | Sept. 29, | 1925 |
| 1,849,436 | Ruben | Mar. 15, | 1932 |
| 1,918,717 | Ruben | July 18, | 1933 |
| 2,049,553 | Weaver | Aug. 4, | 1936 |
| 2,070,644 | Becker | Feb. 16, | 1937 |
| 2,644,902 | Hardway | July 7, | 1953 |
| 2,736,846 | Gables | Feb. 28, | 1956 |
| 2,800,616 | Becker | July 23, | 1957 |
| 2,871,423 | Aikman | Jan. 27, | 1959 |
| 2,910,633 | Hovey | Oct. 27, | 1959 |